73 152 SEARCH ROOM

SYSTEM FOR MEASURING LOW LEVEL PRESSURE DIFFERENTIAL

Filed Dec. 18, 1962 2 Sheets-Sheet 1

Ray Raynor &
Carlton R. Johnson INVENTORS.

BY Gary C. Honeycutt
ATTORNEY

SYSTEM FOR MEASURING LOW LEVEL PRESSURE DIFFERENTIAL

Ray Raynor &
Carlton R. Johnson INVENTORS.

BY Gary C. Honeycutt
ATTORNEY

United States Patent Office 3,247,712
Patented Apr. 26, 1966

3,247,712

SYSTEM FOR MEASURING LOW LEVEL PRESSURE DIFFERENTIAL

Carlton R. Johnson, Tulsa, and Ray Raynor, Claremore, Okla., assignors, by mesne assignments, to Esso Production Research Company, Houston, Tex., a corporation of Delaware Filed Dec. 18, 1962, Ser. No. 245,584
7 Claims. (Cl. 73—152)

This invention relates to the measurement of small differential pressures. A method and apparatus are provided for accurately and reproducibly measuring differential pressures at least as low as .0001 p.s.i. The method and apparatus of the invention are especially useful in measuring low level pressure differentials experienced by a subterranean reservoir.

Conventional techniques of pressure measurement are inadequate for the determination of differential pressures of this magnitude because the act of measuring such slight pressure changes tends inherently to introduce into the system being measured pressure changes as great as those which it is sought to determine. Accordingly, it is an essential feature of the present invention to balance the pressure exerted by the system to be measured with an equal, opposing fluid pressure supplied from an extraneous source. An exact balance is then maintained by continually adjusting the magnitude of the extraneous fluid pressure in response to any pressure changes which appear in the system to be measured. The magnitude of the adjustments required in the balancing pressure is thereby a measure of the pressure differentials experienced by the system being measured.

In one embodiment the apparatus of the invention includes a transparent, meniscus-forming tube, one end of which is adapted for connection to the pressure system wherein small differential pressures are to be measured. The opposite end of the tube is connected to a reference presssure cell or cells, in combination with the necessary valve arrangement whereby the reference pressure may initially be adjusted to exactly balance the initial pressure of the system to be measured, as indicated by the appearance of a meniscus at the center of the tube. A positive displacement pump is connected in fluid communication with the reference cell assembly. A recorder is mechanically connected to the pump to record quantitatively its operation. The pump preferably comprises a helical screw piston and cylinder. Operation of the piston provides a high ratio of revolutions per unit of displacement capacity, thereby increasing the sensitivity of the ultimate record.

In an alternative embodiment, particularly adapted for the measurement of low level subterranean reservior pressure differentials, the apparatus includes a down-hole pressure transducer mounted within a sonde which is equipped with a packer for sealing the sonde within the borehole whereby subsequent changes below the transducer result in a pressure imbalance which is detected by the transducer and transmitted to surface equipment. The borehole or tubing volume above the transducer sonde serves as a reference pressure cell. A pressure recharge line containing a two-way gas metering system is connected at the well head for adjusting the pressure above the transducer and thereby restoring the condition of exact pressure balance at the transducer. Although the system may be operated manually, automation is preferably provided, for example by connecting the transducer output to an automatic valve system, and the gas metering system output to a recorder. The automatic valve system is provided in the recharge line to the well head and is activated by the transducer signal whereby a pressure balance is automatically maintained. The record of gas meter readings is readily calibrated as a direct measure of pressure differentials experienced at the borehole bottom.

Figure 1:
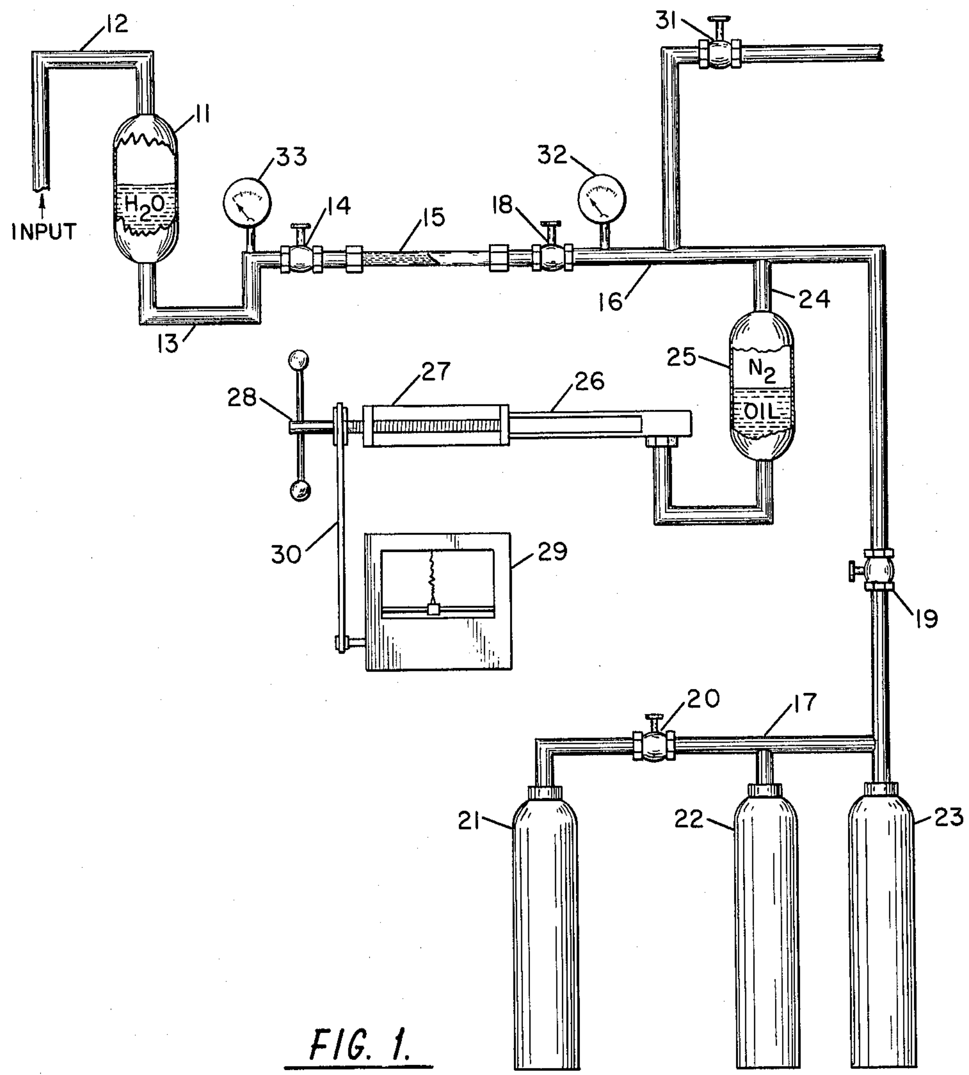
FIGURE 1 is a diagrammatic view of the pressure measuring system of the invention wherein a pressure balance is indicated by a meniscus.

In FIGURE 1 the embodiment shown is composed of surge vessel 11 the upper inlet end of which is adpated for connection to the fluid system wherein small differential pressures are to be measured. Conduit 13 leading from the lower end of vessel 11 is connected through valve 14 to meniscus forming tube 15. The opposite end of tube 15 is connected by lines 16 and 17 through valves 18 and 19 to reference pressure cylinders 22 and 23, and through valve 20 to recharge cylinder 21.

Branch line 24 running from conduit 16 contains surge vessel 25 and terminates with cylinder 26 of positive displacement pump 27. Pump piston 28 is a helical screw, moved into or out of cylinder 26 by a rotary motion imparted thereto. Recorder 29 is connected to piston 28 by means of belt drive 30.

In operation, pressure to be measured is admitted to inlet 12 of vessel 11 which contains water or other fluid capable of forming a meniscus when admitted to tube 15. Cylinder 21 contains a reserve supply of nitrogen or other gas at a pressure well in excess of the input pressure, differential changes in which are to be measured. Initially, cylinders 22 and 23 contain gas at a pressure somewhat below that of the input pressure in which differential pressures are to be measured. While valves 18 and 31 are closed, and valve 19 is open, valve 20 is momentarily opened to provide a reading at pressure gauge 32 which is slightly greater than the input pressure measured at gauge 33. Valves 14 and 18 are then opened, admitting the opposing pressures to tube 15. Since the reference pressure supplied from cylinders 22 and 23 is slightly greater than the input pressure measured at gauge 33, a gas-water interface will temporarily be located within line 13. By slowly bleeding excess pressure through valve 31 the water level within line 13 is readily drawn into meniscus-forming tube 15. Valve 31 is then closed when the meniscus within tube 15 is stabilized at a balance point indicated by a suitable hairline or other mark on tube 15.

After this balancing procedure, small changes in the input pressure tend to cause the meniscus to drift from the center line in tube 15. Pump 27 is controlled by rotating piston 28 to charge or discharge reference cells 22 and 23 sufficiently to compensate for the drift of the meniscus and to hold it at the center line of tube 15. Revolutions of piston 28 are recorded by instrument 29 which plots the changes in pump displacement versus time. By measuring the volume of reference cells 22 and 23, in combination with the connecting lines associated therewith, and cylinder 26, differential input pressures as recorded are easily converted to pounds per square inch, or other desired units.

The body of water or other liquid contained in surge vessel 11 functions to provide a meniscus within tube 15. The meniscus may be separately provided, however, without departing from the scope of the invention.

Tube 15 is preferably transparent since it is convenient to follow the meniscus therein visually. Means are readily available, however, which are capable of following a meniscus within an opaque tube. Moreover, tube 15 need not be horizontally disposed as shown in the drawing. It may instead be disposed vertically or at some intermediate angle. As a matter of fact, tube 15 may be replaced by any sufficiently sensitive, bi-directional element capable of detecting extremely small pressure differentials.

Pressure reference cells 22 and 23 and recharge cylinder 21 are conventional gas cylinders. A great number of commercially available gases are suitable as a source of extraneous pressure for use in the present system. Nitrogen is a convenient example. It is especially desirable to protect the pressure cells from sudden temperature changes incidental to atmospheric conditions. A convenient method of providing this protection is to bury the cylinders in the ground or insulate them.

Pump cylinder 26 and a portion of surge vessel 25 are filled with oil or other convenient liquid in order to facilitate the provision of an effective seal within pump 27.

Rotation of helical screw piston 28 in one direction causes an increase of pressure within the reference cell assembly, thereby compensating for increased pressures as they occur in the input line 12. Rotation in the opposite direction reduces the pressure of the reference assembly in order to compensate for reductions in the input pressure.

Recording means 29 is mechanically driven by the rotation of piston 28. Belt drive 30 may be replaced by a chain drive or by a direct gear mechanism. The pen of recorder 29 is independently controlled by a timing mechanism whereby the plot produced is a record of pump displacement versus time, which may readily be calibrated in pressure units versus time.

Pressure gauges 32 and 33 are conventional gauges used only as a rough guide during the initial procedure of balancing the input pressure against the reference pressure. Conventional gauges of this type obviously do not provide adequate sensitivity for the measurement of extremely small differential pressures.

Figure 2:
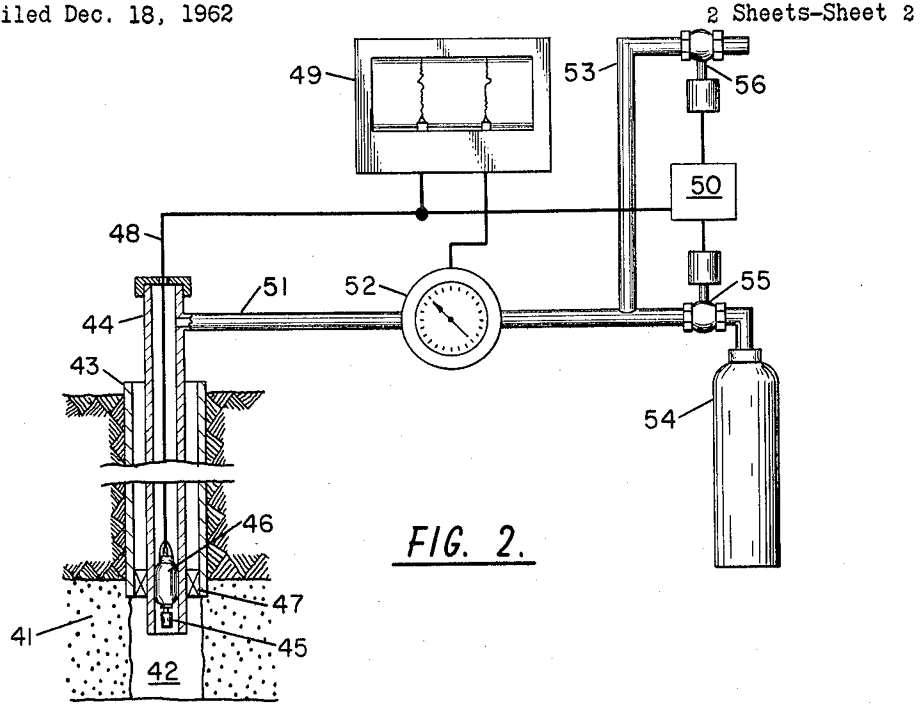
FIGURE 2 is a schematic view of the alternate system wherein a downhole transducer is employed to indicate differential pressures.

Referring now to FIGURE 2, a system of apparatus is provided for measuring small differential pressures which occur within reservoir 41 at the bottom of borehole 42. As shown, the borehole is provided with casing 43 and tubing 44. Transducer sonde 45 is sealed within tubing by means of a conventional retrievable packer 46. Since pressures above and below the transducer are initially equal, any subsequent change of pressure at the borehole bottom, caused by pressure changes occurring within the reservoir, are readily detected as a differential pressure at the transducer. In the embodiment shown, the annulus between tubing 45 and casing 43 is sealed by packer 47. For wellbores having a tubingless completion, packer 46 will engage casing 43 directly, eliminating the tubing string and the need for an additional packer 47.

Sonde 45 is suspended within the wellbore by means of a cable 48 which transmits the transducer signal to a conventional two-pen recorder 49 at the surface, and to a controlling relay device 50. The surface equipment also includes well head recharge line 51, containing two-way gas metering system 52, vent line 53 and recharge cylinder 54.

Automatic valve 55 is provided for recharging the wellbore or tubing above the transducer sonde in order to compensate for increased pressure as it occurs in the reservoir below the transducer sonde. Automatic valve 56 is provided for bleeding excess pressure from the wellbore above the transducer sonde in order to compensate for pressure reduction as it occurs below the transducer sonde within the reservoir. Valves 55 and 56 are normally closed, and are opened by solenoids, for example, upon activation by controller 50.

Relay controller 50 is any conventional switching device capable of receiving the output signal from transducer 62 and selectively energizing one of valves 55 and 56 in response thereto. For example, a simple plunger type, single pole, double throw, center off, relay which activates valve 55 in response to a D.C. signal of positive polarity, and valve 56 in response to a D.C. signal of negative polarity, is adequate.

Metering system 52 is any system for metering both the volume of recharge gas entering the tubing string through line 51, and the volume of gas removed therefrom through vent line 53. For example, a single gas meter of the rotary vane or helical impeller types is capable of metering gas flow in both directions, and is suitable for the purposes of this embodiment.

Figure 3:
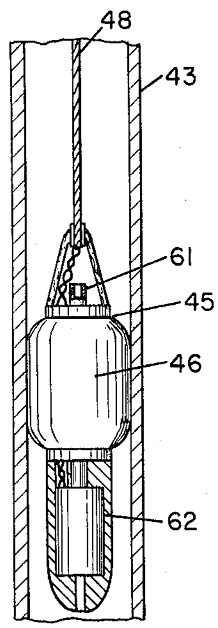
FIGURE 3 shows the essential structure of the transducer sonde.

FIGURE 3 shows the details of transducer sonde 45, which includes rigid tubular element 61 having a bi-directional differential pressure transducer 62 mounted within a central portion thereof. A small diameter bore is provided along substantially the entire longitudinal axis of element 61 above and below the transducer to provide fluid communication between the reservoir or borehole bottom and the lower side of transducer 62, and to provide fluid communication between the upper borehole volume and the upper side of transducer 62. The transducer is oriented to provide a D.C. output of positive polarity, for example, in response to an increase in pressure below the sonde, and of negative polarity in response to a decrease in pressure below the sonde. A suitable power source and amplifier (not shown) are provided to strengthen the transducer output.

Other differential pressure transducers are available for use in place of transducer 62, including resonance circuit transducers which provide A.C. outputs of differing frequencies to distinguish between increased and decreased pressure below sonde 45. A third type provides an output of variable amplitude in response to opposite differentials. Commercial examples include Model 2416.1 and 2417.1 of the Ruska Instrument Corporation of Houston, Texas, and Model PT-35 of Dynisco Division of American Brake Shoe Company of Cambridge, Massachusetts.

Referring now to FIGURES 2 and 3 in combination, the operation of the system proceeds as follows. Any increase in bottom hole pressure is immediately detected by transducer 62 which generates a D.C. output signal which is amplified and transmitted to recorder 49 and to controller 50 at the surface. In response to the transducer signal, relay controller 50 automatically opens valve 55 to permit a re-pressuring of the borehole by the flow of gas from cylinder 54 through metering system 52 and line 51, thereby restoring a zero pressure differential across transducer 62.

If on the other hand the pressure at bottom hole should decrease, a differential pressure is also immediately detected by transducer 62. In this event however, the D.C. output generated by the transducer has a different polarity, frequency or amplitude, which enables it to be distinguished from the signal generated by the reverse differential described above. When the transducer signal of reversed polarity or changed amplitude or frequency is transmitted to controller 50 at the surface, the controller operates to open valve 57 automatically, bleeding excess pressure from the tubing or borehole volume above the transducer sonde, thereby restoring a zero pressure differential across the transducer.

Recorder 49 records the output of two-way gas metering system 52. A plot of metered volume versus time is obtained which is readily calibrated to provide a direct measure of differential pressures occurring at bottomhole, or within the reservoir.

Numerous other embodiments and applications of the invention will readily occur to those skilled in the art. Accordingly, it is intended that no limitation be imposed on the scope of the invention, other than as recited in the appended claims.

What is claimed is:

1. A method for measuring small pressure changes at a substantial depth within a wellbore which comprises packing a pressure transducer within the wellbore at the level where differential pressures are to be measured; transmitting a signal from the transducer, indicative of any pressure imbalance in the borehole, to a surface control system; metering fluid into the upper portion of the borehole in response to a rise of pressure below the transducer, and metering fluid from the upper portion of the borehole in response to a drop of pressure below the transducer, whereby a balance of pressure is maintained at the transducer; and recording the volume of fluid metered to and from the borehole, as a measure of the pressure changes below the transducer.

2. Apparatus for obtaining an accurate measure of slight pressure changes in a large fluid mass which comprises a transparent tubular element of suitable bore diameter for the formation of meniscus therein; a surge vessel having an inlet in an upper portion thereof and an outlet in the lower portion thereof, the inlet being adapted for connection to the said fluid mass, and the outlet being connected to one end of the tubular element; at least two reference pressure cells connected to the other end of the tubular element; valve means for balancing the pressure of at least one cell against the pressure to be measured, whereby a meniscus may be held at a point between the ends of said tubular element; a positive displacement pump also connected to said other end of the tubular element; and recording means operatively connected to the pump, whereby operation of said pump to maintain said meniscus relatively immobile provides a record which is a quantitative measure of the differential pressure changes in said fluid mass.

3. Apparatus for obtaining an accurate measure of slight pressure changes occurring within a porous subterranean reservoir, which comprises a bi-directional differential pressure transducer assembly packed within a wellbore, means for balancing the pressure above the transducer assembly against the bottom hole pressure in response to signals generated by said transducer indicative of variations in the reservoir pressure, and means for recording the operation of said balancing means as a measure of differential changes in the reservoir pressure.

4. Apparatus for accurately measuring pressure changes within a porous subterranean reservoir penetrated by a wellbore, which comprises a bi-directional differential pressure transducer assembly, means for packing said assembly within said wellbore, means for metering a fluid into said wellbore above the transducer in response to an increase in reservoir pressure below the transducer and means for metering fluid from said wellbore in response to a decrease in reservoir pressure, means for controlling the transfer of fluid to and from said wellbore in response to signals generated by said transducer, whereby a balance of pressures can be maintained at the transducer, and means for providing a record of the volumes of fluid transferred to and from said wellbore, said record being indicative of pressure changes occurring below said transducer.

5. Apparatus for obtaining an accurate measure of slight pressure changes in a fluid mass which comprises a tubular element of a suitable bore diameter for the formation of a meniscus therein; means for establishing fluid communication between said fluid mass and one end of said tubular element; a reference pressure cell in communication with the other end of said tubular element; a positive displacement pump also in fluid communication with said other end of the tubular element; and recording means operatively connected to the pump, whereby operation of said pump to maintain said meniscus relatively immobile within said tubular element provides a record which is a quantitative measure of pressure changes in said fluid mass.

6. Apparatus for measuring small pressure changes at a substantial depth in a wellbore which comprises a pressure transducer packed within said wellbore above the level where pressure changes are to be measured; means for transmitting a signal from the transducer to a surface control system; means for metering fluid into the upper portion of the borehole in response to a signal indicating increased pressure below said transducer; and means for metering fluid from the upper portion of the borehole in response to a signal indicating decreased pressure below the transducer, whereby a balance of pressure is maintained at the transducer; and means for recording the volume of fluid metered to and from the borehole as a measure of pressure changes occurring below the transducer.

7. Apparatus for obtaining a record of pressure changes in a fluid mass which comprises means for forming a stable fluid-fluid interface; means for exposing one side of said interface to the pressure of said fluid mass; means exposing the other side of said interface to a source of reference pressure; means for metering fluid to and from said reference source as required to maintain said interface substantially immobile; and means for providing a record of the volumes of fluid thus metered, said record being indicative of pressure changes having occurred in said fluid mass.

References Cited by the Examiner

UNITED STATES PATENTS

| | | | |
|---|---|---|---|
| 2,360,742 | 10/1944 | Toth et al. | 73—302 X |
| 2,434,837 | 1/1948 | Cornett | 73—401 |
| 2,701,854 | 2/1955 | Carrick | 73—401 X |
| 2,788,664 | 4/1957 | Coulbourn et al. | 73—398 |
| 2,792,709 | 11/1957 | Bell et al. | 73—302 X |
| 2,906,120 | 9/1959 | Buck | 73—151 |
| 2,942,466 | 6/1960 | Barron et al. | 73—302 |
| 2,961,868 | 11/1960 | Hooper | 73—40 |
| 2,962,892 | 12/1960 | Weller | 73—116 |
| 3,025,405 | 3/1962 | Dadas | 73—401 X |

OTHER REFERENCES

Kovacic: "A Simple Micromanometer," Journal of Scientific Instruments, vol. 30, Sept. 1953, pages 304–305, Q 184.j7.

LOUIS R. PRINCE, *Primary Examiner.*

JOSEPH P. STRIZAK, RICHARD QUEISSER, *Examiners.*